United States Patent
Partovi et al.

(10) Patent No.: US 8,340,697 B1
(45) Date of Patent: Dec. 25, 2012

(54) METHOD AND COMPUTER-READABLE MEDIUM FOR DYNAMICALLY ADJUSTING A MULTIMEDIA DATA RESOLUTION IN A WIRELESS ENVIRONMENT

(75) Inventors: Mohammad Hassan Partovi, Potomac, MD (US); Roy Leo Spitzer, Rockville, MD (US)

(73) Assignee: Nextel Communications Inc., Reston, VA (US)

( * ) Notice: Subject to any disclaimer, the term of this patent is extended or adjusted under 35 U.S.C. 154(b) by 1500 days.

(21) Appl. No.: 11/339,633

(22) Filed: Jan. 26, 2006

(51) Int. Cl.
 *H04W 72/00* (2009.01)
(52) U.S. Cl. .................. 455/464; 455/414.1; 455/414.2; 455/414.3; 455/450; 455/452.2; 370/395.41; 370/433; 370/464; 370/477; 370/493; 379/88.13; 709/226
(58) Field of Classification Search ............... 455/452.2, 455/414.1, 414.2, 414.3, 450, 464, 509; 370/468, 370/395.41, 433, 464, 477, 493; 379/88.13; 709/226

See application file for complete search history.

(56) References Cited

U.S. PATENT DOCUMENTS

| | | | | |
|---|---|---|---|---|
| 6,201,971 B1* | 3/2001 | Purnadi et al. | ................. | 455/450 |
| 6,392,482 B1* | 5/2002 | Dartois | ......................... | 330/151 |
| 6,526,036 B1* | 2/2003 | Uchida et al. | .................. | 370/342 |
| 6,535,743 B1* | 3/2003 | Kennedy et al. | ............ | 455/456.1 |
| 6,637,031 B1* | 10/2003 | Chou | .............................. | 725/87 |
| 7,142,864 B2* | 11/2006 | Laroia et al. | ................... | 455/450 |
| 7,330,542 B2* | 2/2008 | Kauhanen et al. | ............ | 379/229 |
| 2002/0013154 A1* | 1/2002 | Soh et al. | ...................... | 455/466 |
| 2002/0080737 A1* | 6/2002 | Koo et al. | ..................... | 370/329 |
| 2003/0022667 A1* | 1/2003 | Kim | ............................... | 455/426 |
| 2003/0157934 A1* | 8/2003 | Liang | ............................ | 455/436 |
| 2003/0182610 A1* | 9/2003 | Bushmitch et al. | ........... | 714/746 |
| 2003/0213000 A1* | 11/2003 | Campbell | ...................... | 725/120 |
| 2004/0009761 A1* | 1/2004 | Money et al. | ................. | 455/406 |
| 2004/0160915 A1* | 8/2004 | Gorsuch et al. | ............... | 370/329 |
| 2004/0162818 A1* | 8/2004 | Shaw | ................................ | 707/3 |
| 2004/0192322 A1* | 9/2004 | Dacosta et al. | ............. | 455/452.1 |
| 2004/0228294 A1* | 11/2004 | Kim et al. | ..................... | 370/312 |
| 2004/0266391 A1* | 12/2004 | Hafren | ......................... | 455/405 |
| 2005/0204030 A1* | 9/2005 | Koch et al. | .................... | 709/223 |
| 2005/0235048 A1* | 10/2005 | Costa-Requena et al. | .... | 709/219 |
| 2006/0025148 A1* | 2/2006 | Karaoguz et al. | ........... | 455/452.2 |
| 2006/0025149 A1* | 2/2006 | Karaoguz et al. | ........... | 455/452.2 |
| 2007/0054634 A1* | 3/2007 | Seppala | ........................ | 455/121 |

FOREIGN PATENT DOCUMENTS

| EP | 1400934 | * | 3/2004 |
|---|---|---|---|
| EP | 1400934 A1 | * | 3/2004 |

* cited by examiner

*Primary Examiner* — Meless N Zewdu
*Assistant Examiner* — Amanuel Lebassi

(57) ABSTRACT

A method and computer-readable medium for dynamically adjusting a multimedia data resolution in a wireless environment is provided. The method includes: determining the access profile of the mobile station; monitoring transmission conditions in the wireless system; transmitting the multimedia data and control signaling to the mobile station with a highest resolution based upon the transmission conditions, wherein the control signaling determines an amount of the multimedia data accessible to the mobile station based upon the access profile of the mobile station; and decreasing a resolution of the multimedia data being transmitted to the mobile station, if the transmission conditions become unacceptable for transmitting the multimedia data at the highest resolution. If the transmission conditions become acceptable for transmitting the multimedia data at a higher resolution, the resolution of the multimedia data being transmitted to the mobile station is increased to the highest possible resolution based upon the transmission conditions.

29 Claims, 7 Drawing Sheets

FIGURE 3

Signaling

| Forward Access Channel (signaling for user channel assignment) |
|---|

Data

| Forward Common Shared Channel (Basic encoding) Time Period 0 to 50 ms | Forward Common Shared Channel (Enhanced 1 encoding) Time Period 50 to 100 ms | Forward Common Shared Channel (Enhanced 2 encoding) Time Period 50 to 100 ms |
|---|---|---|

| User ID | RCV Channel | Period | Video Service | Viewed Channels | | |
|---|---|---|---|---|---|---|
| 15 | FCSC | 0-50 | Basic | ▨ | | |
| 27 | FCSC | 0-100 | Basic+EH1 | ▨ | ▥ | |
| 32 | FCSC | 0-150 | Basic+EH1+EH2 | ▨ | ▥ | ▤ |
| 57 | FCSC | 0-100 | Basic+EH1 | ▨ | ▥ | |
| 65 | FCSC | 0-50 | Basic | ▨ | | |
| 82 | FCSC | 0-50 | Basic | ▨ | | |

Basic Encoding 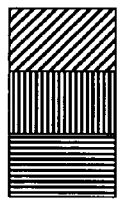

Enhanced 1 Encoding

Enhanced 2 Encoding

METHOD AND COMPUTER-READABLE MEDIUM FOR DYNAMICALLY ADJUSTING A MULTIMEDIA DATA RESOLUTION IN A WIRELESS ENVIRONMENT

BACKGROUND OF THE INVENTION

The present invention relates to communications between mobile stations and base stations in a wireless network, and more particularly to broadcast/multicast communications in the wireless network.

Transmission of multimedia data, such as video, has become more prevalent recently. For example, users desire to receive broadcast communications and to send and receive video data on their mobile stations, e.g., cell phones, PDAs, PCs, etc. Multimedia data often requires more bandwidth than other types of data, such as voice communications. However, due to bandwidth limitations, the growth in the transmission of multimedia data presents a problem for wireless networks.

Transmissions in wireless networks typically use unicast, multicast, or broadcast communications. Unicast generally refers to communications over a network between one sender and one receiver. Multicasting generally refers to transmissions to users/devices that have joined a particular multicast group. Broadcasting in a network generally refers to sending information to all of the users on the network.

Under a unicast approach, each user in a wireless network has his/her own connection profile and is treated separately. In this environment, multiple users cannot share a common air interface channel due to varying quality of service (QoS) needs. Thus, separate channels are set up for each of the users. Because of this approach, air interface traffic in the wireless network is significantly impacted. For example, the number of users per cell significantly decreases with every high bandwidth video connection, leaving limited support for multiple video connections. Because separate channels are set up for each of the users, identical high bandwidth channels transmitted to multiple destinations are often used, which requires significant wireless network resources. The above-described individual unicast transmissions to each user are too inefficient and do not take advantage of the efficiencies of multicasting.

Multicasting provides improvements over the multi-path unicast approach, but typical multicasting is still inefficient. For example, a separate multicast connection will exist for each profile, even though the same media content is sent.

Additionally, users sharing a multicast connection cannot change their service/Quality of Service (QoS) profile, e.g., picture quality, in real time without disconnecting from the current active connection. Also, users cannot easily compensate for traffic impairments on a multicast connection. Moreover, due to high bandwidth demand, handoff is cumbersome and difficult, e.g., an adjacent sector may not have the required bandwidth. Likewise, joining and leaving a multicast wireless group is difficult to implement.

SUMMARY OF THE INVENTION

The present invention provides a method and computer-readable medium for dynamically adjusting a multimedia data resolution in a wireless environment. By dynamically adjusting the multimedia data resolution at the mobile station, multiple mobile stations with different QOS requirements can use the same data stream. This scheme ensures that each mobile station receives only the necessary and sufficient data that matches its configured QOS. The base station transmits the highest resolution multimedia data while signalling to the mobile station limits the reception to the configured QOS. This scheme minimizes the overall downlink bandwidth on the Radio Frequency transport.

Also, the present invention provides a method and computer-readable medium for dynamically modifying an access profile of a mobile station to allow the mobile station to increase or decrease its level of quality access to multimedia data. An access profile includes the characteristics that define the level of quality of multimedia data transmissions associated with a mobile station. The mobile station may be billed for the multimedia data based upon the access profile.

Other objects, advantages, and novel features of the present invention will become apparent from the following detailed description of the invention when considered in conjunction with the accompanying drawings.

BRIEF DESCRIPTION OF THE DRAWINGS

FIG. 3 illustrates an exemplary bandwidth allocation based upon a multi-layered transmission, in accordance with the present invention;

DETAILED DESCRIPTION OF THE EXEMPLARY EMBODIMENTS

The present invention provides methods and computer-readable media for communicating between base stations and mobile stations in a wireless network, in either a multicast environment or a broadcast environment. In a multicast environment, each connection between a base station and a plurality of mobile stations is associated with a class or group of users. The connection between the base station and the mobile stations is via an air interface. Multicast requirements for a particular connection may include only the air interface.

Although multicasting is primarily described below, the methods and computer-readable media disclosed herein relate to broadcasting as well as multicasting. Examples of high-level multimedia services that may utilize the present invention include, but are not limited to, Digital Video Broadcasting (DVB) and Open Cable Application Platform (OCAP).

Figure 1:
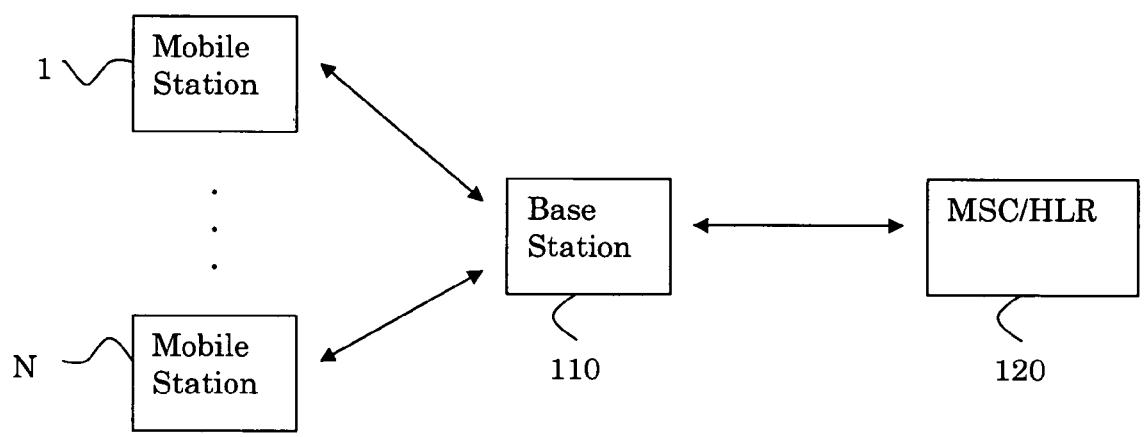
FIG. 1 illustrates an exemplary embodiment of a wireless network in accordance with the present invention.

An exemplary embodiment of a wireless network according to the present invention is illustrated in FIG. 1. As illustrated in FIG. 1, the wireless network may include mobile stations 1 through N, base station 110, and MSC/HLR (Mobile-services Switching Center/Home Location Register)

120. Although only one base station is illustrated, the wireless network may include a plurality of base stations.

In accordance with an exemplary embodiment of the present invention, there is a method for transmitting multimedia data based upon an access profile of a mobile station in a wireless system, in which the resolution of the multimedia data is modified based upon the transmission conditions. In this context, resolution may be described in terms of a level of quality or service of the multimedia data, where multiple quality or service levels are available. For example, some multimedia encoding schemes, such as MPEG-4, provide basic encoding information and enhanced encoding information. In accordance with the present invention, the basic and enhanced information can be transmitted over different channels. Lower resolution can be provided by accessing and decoding the basic information, and higher resolution can be provided by accessing and decoding both the basic and enhanced information. In exemplary embodiments of the present invention, the available service levels may be mapped to the basic and enhanced encoding levels by an application programming interface (API).

Figure 2:
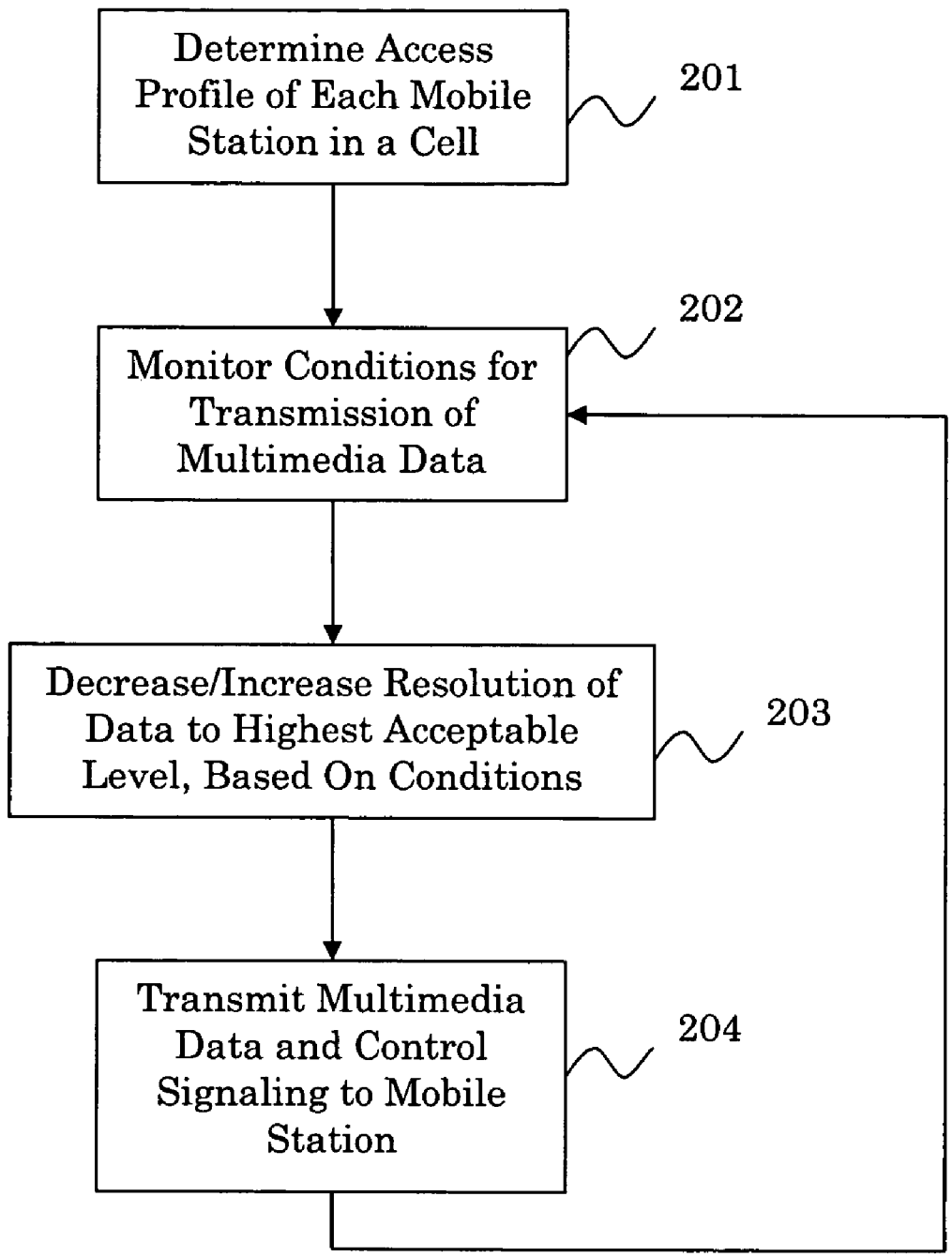
FIG. 2 illustrates an exemplary method for controlling multimedia data reception based upon an access profile of a mobile station in a wireless system, in which the resolution of the multimedia data is modified based upon a mobile station subscription and the transmission conditions, in accordance with the present invention.

FIG. 2 illustrates an exemplary method for transmitting multimedia data based upon an access profile of a mobile station in a wireless system, in which the resolution of the multimedia data is modified based upon the transmission conditions, in accordance with the present invention. The access profile of the mobile station, e.g., mobile station 1 in FIG. 1, is determined in step 201. The transmission conditions in the wireless system are monitored in step 202. The transmission conditions may include, but are not limited to, environmental conditions and bandwidth limitations, for example. Multimedia data is broadcasted to every mobile station in the cell. Selective control signaling is transmitted to the mobile station 1 permitting the highest resolution based upon the transmission conditions and access profile of the mobile station (i.e., QOS SLA) in step 204. The control signaling may be used to determine an amount of the multimedia data accessible to the mobile station 1, based upon the access profile of the mobile station. The control signaling may indicate to the mobile station which channels it can read. The resolution of the multimedia data being transmitted to the mobile station may be automatically decreased in step 203, if the transmission conditions become unacceptable for transmitting the multimedia data at the highest resolution (e.g., the highest level of service required by a mobile station in the cell). As illustrated by the feedback path from step 204 to step 202 in FIG. 2, the transmission conditions may be continuously or repeatedly monitored, and the resolution may be repeatedly changed based on the monitored transmission conditions.

As described above, the resolution of the multimedia data may be decreased based upon the transmission conditions of the wireless system in step 203. For example, if the resolution of the multimedia data currently being transmitted is lower than the highest resolution possible, based upon the monitored transmission conditions, then the resolution may be increased.

In the method illustrated in FIG. 2, a single multimedia data transmission may be sent to a plurality of mobile stations. For example, a single multimedia data stream may be transmitted to all of the mobile stations in a network. Each mobile station has its own access profile, which determines how much of the multimedia data is accessible to the mobile station. In particular, the control signalling transmitted with the multimedia data may indicate an amount of the multimedia data that is accessible to each of the mobile stations, based upon the access profile of each of the mobile stations.

By decreasing the resolution of the multimedia data transmission, based on the transmission conditions, mobile stations can continue to receive the multimedia data at a decreased resolution. The decreasing of the resolution affects all of the members of a group of users (e.g., mobile stations). Only the mobile stations that have greater resolution than transmission conditions will see decreased resolution. Without this dynamic adjustment of the multimedia data resolution, the multimedia data transmission could be lost entirely, due to the transmission conditions. By dynamically increasing the resolution of the multimedia data transmission when the transmission conditions improve, mobile stations can receive the highest resolution multimedia data as often as the transmission conditions and access profile will allow.

In exemplary embodiments of the present invention, the access profile may include a service level agreement between a user and a service provider, or a quality of service level. The access profile of the mobile station may be stored, for example, in a lookup table in which a user ID corresponding to the mobile station is associated with the access profile. The access profile may be distributed to an associated switching device (e.g., base station) of the wireless system, for example.

To provide multimedia data to a group of mobile stations having a plurality of access profiles, a base station may partition the multimedia data into multiple channels, using a multi-layered encoding scheme (e.g., MPEG-4). The channels may include a basic encoding channel and enhanced encoding channels, for example, as illustrated in FIG. 3.

In FIG. 3, all of users 15, 27, 32, 57, 65, and 82 have access to the basic channel of data, but only users 27, 32, and 57 have access to the data in the enhanced 1 channel, and only user 32 has access to the data in the enhanced 2 channel. All of the data in the basic channel and in both enhanced channels may be received by all of the users, but only the users described above have access to the enhanced 1 and enhanced 2 data, based upon the access profiles of the users. The time periods and other information illustrated in FIG. 3 are merely exemplary.

In addition to being used to determine the amount of multimedia data accessible to the mobile stations, the access profile may be used to determine the proper billing amount for each mobile station. For example, mobile stations may be billed based upon the level of service selected by users. The access profiles may be used to define the selected level of service for each mobile station. Thus, based upon the multimedia data received by the mobile stations and the corresponding level of service of each of the mobile stations, the mobile stations may be billed for the multimedia data.

In another exemplary embodiment of the present application, users can modify the access profile of their respective mobile stations. To modify the access profile of a mobile station, the subscriber can send a request to modify the active access profile to a Mobile Switching Center. If the mobile station/subscriber requesting the modification is authorized to have the requested access profile, the active access profile of the mobile station is modified as requested. The configured access profile indicates the best QOS that the mobile station/subscriber may use/request. Once the active access profile is modified, the mobile station's ability to access the multimedia data changes in correspondence with the modified access profile. By modifying the active access profile of a mobile station to a higher level, the mobile station has access to higher quality multimedia data. If the access profile is modified to a lower level, the mobile station has access to lower quality multimedia data. For example, when the access profile for user 15 in FIG. 3 is modified to a higher level, user 15 may begin to have access to enhanced 1 encoded data (e.g., providing better picture granularity for videos).

When a change in an air interface protocol occurs for a mobile station, modification of the access profile of the mobile station may automatically occur. For example, when a mobile station moves from a CDMA 2000 1xEVDO environment to a CDMA 1xRTT environment, a user of the mobile station may continue viewing a desired multimedia data stream, but the multimedia data stream may have a lower level of quality or resolution for viewing.

Figure 4:
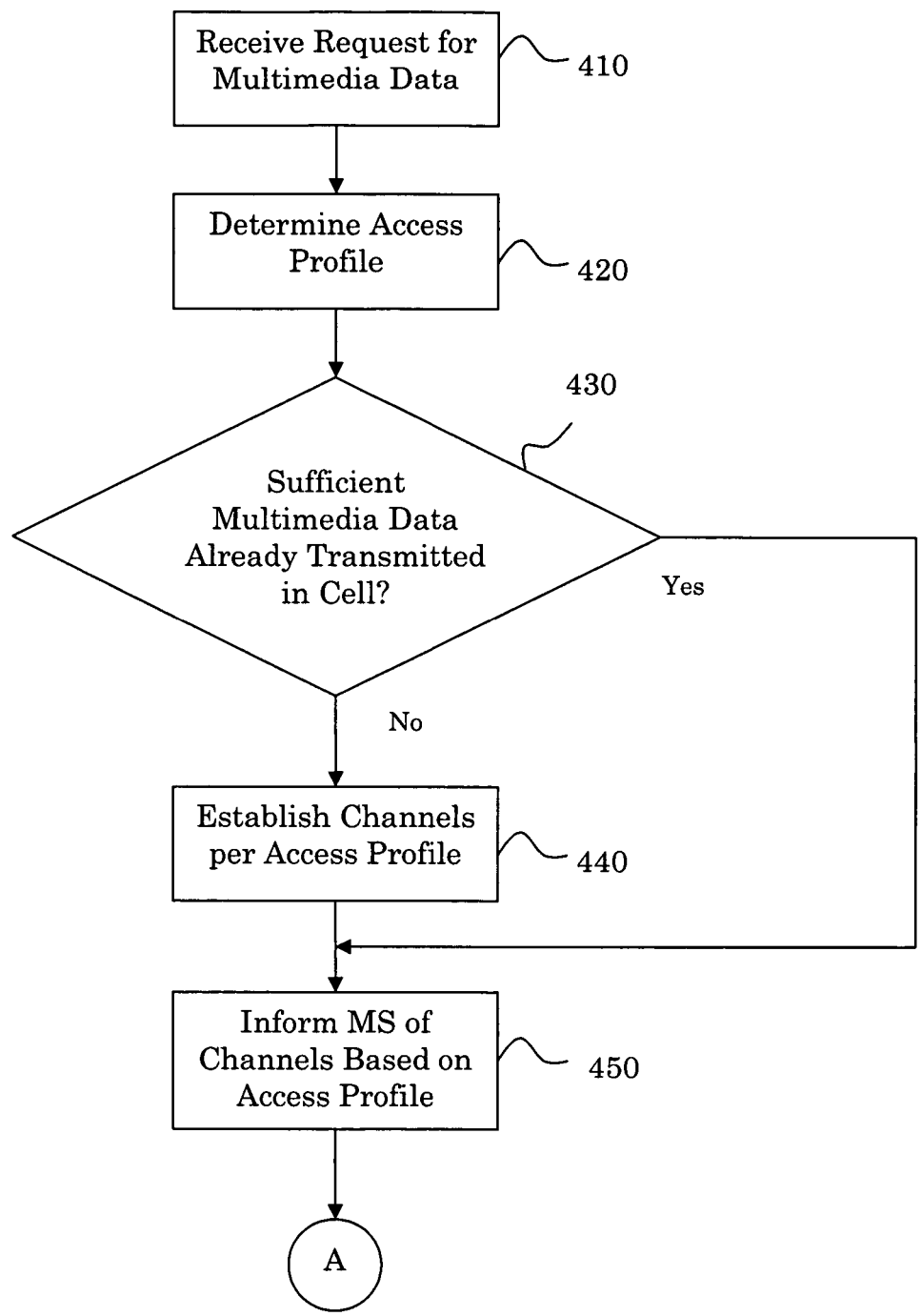
FIG. 4 illustrates an exemplary method for establishing a multimedia channel in accordance with the present invention.

FIG. 4 illustrates an exemplary embodiment of a method for establishing a multimedia channel association for a mobile station in a wireless environment according to the present invention. As illustrated in FIG. 4, a base station receives a request for multimedia data from a mobile station in step 410. The base station may request connection information and a user access profile for the mobile station from a switching center, such as SoftSwitch/HSS (Home Subscriber System) or MSC/HLR. In step 420, the access profile of the mobile station is determined. It is determined in step 430 whether multimedia data is already being transmitted in the cell. If sufficient multimedia data (e.g., basic and enhanced data) is being transmitted, the mobile station is informed of the channels it has access to, based upon its access profile, in step 450. The multimedia data can be sent to a plurality of mobile stations, wherein the access profile of each mobile station can be used to determine the amount of the multimedia data accessible to the respective mobile stations. On the other hand, if sufficient multimedia data (e.g., basic and enhanced data) is not already being transmitted in the cell, the channels are established based on the access profile, in step 440. Then the mobile station is informed of the channels it has access to, based on its access profile, in step 450. The MSC, for example, may establish a multimedia data stream to the base station, if there is no multimedia data stream already present, and if the mobile station is authorized to receive the multimedia data stream.

Figure 5:
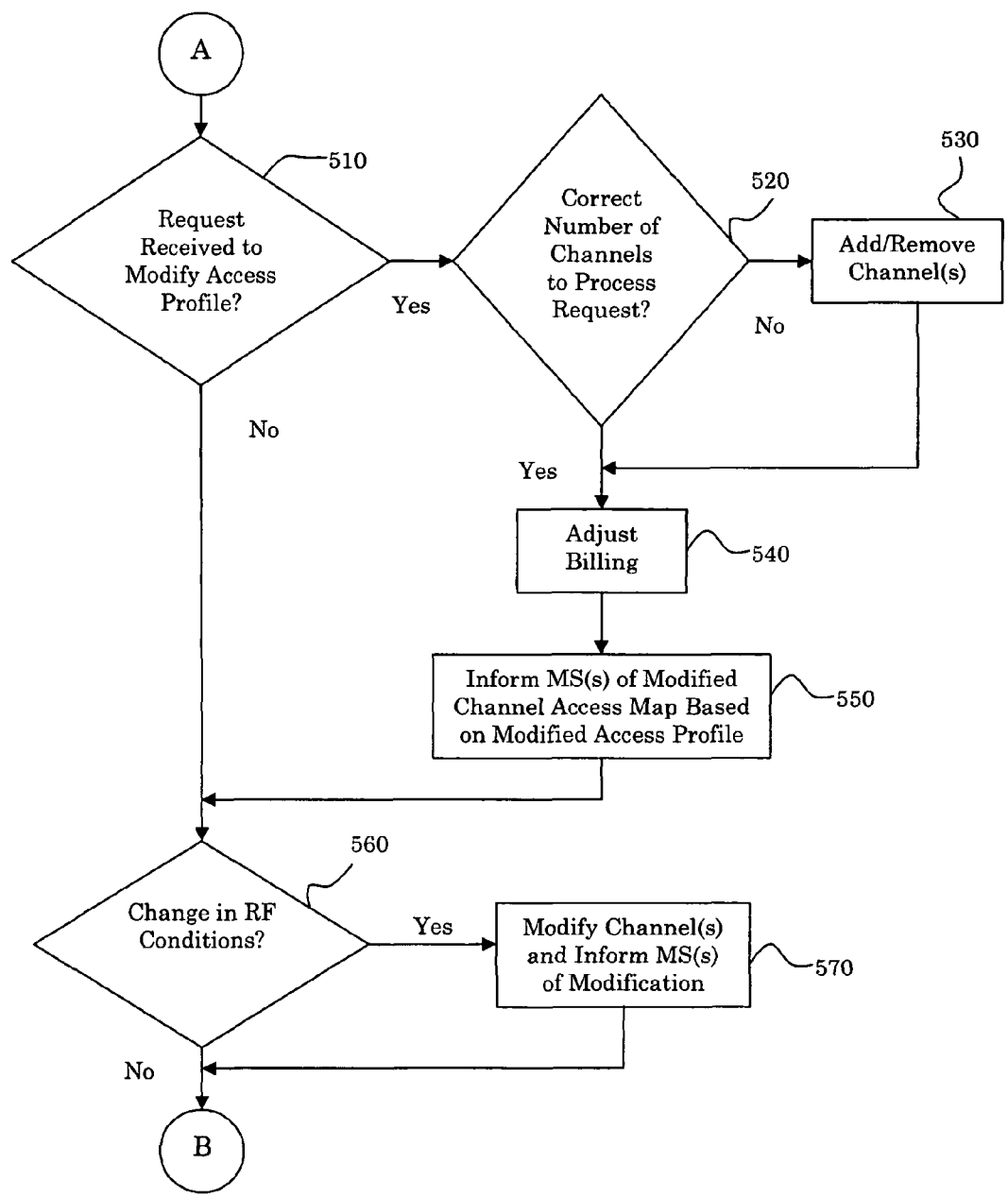
FIG. 5 illustrates an exemplary embodiment of a method for multimedia channel access profile modification in accordance with the present invention.

FIG. 5 illustrates an exemplary method for modifying a multimedia channel access profile of a mobile station. As illustrated in FIG. 5, it is determined in step 510 whether a request is received to modify a multimedia channel access profile, i.e., to increase or decrease the access profile. If a request is received in step 510 to modify the access profile, a determination is made in step 520 of whether the correct number of channels are available to process the request. If there are not sufficient channels, channels are added to the multimedia data available to the mobile station, in step 530. If the request is for a decrease in the access profile, channels are removed in step 530. In other words, in the method illustrated in FIG. 5, the multimedia channel access profile may be modified, based upon the requested access profile modification, if the mobile station is authorized to have the requested modification to the multimedia channel access profile.

If it is determined in step 520 that sufficient channels are available to process the request, or, if sufficient channels are added/removed in step 530, the billing arrangement is adjusted in step 540 to reflect the modified access profile. In step 550, the mobile station is informed of the added/removed channels corresponding to the modified access profile. Thus, multimedia channels may be associated with the mobile station, based upon the modified multimedia channel access profile.

As described above, the transmission conditions of the mobile station may be monitored and used to modify the level of multimedia data transmitted to the mobile station. For example, once it is determined that no request to modify the access profile has been received in step 510, or after the mobile station is informed of the modified channels corresponding to the modified access profile in step 550, it is determined in step 560 whether there is a change in the RF conditions for the mobile station. If there is change in the RF conditions, the channels accessible by the mobile station may be modified, e.g., increased or decreased, based on the mobile station's access profile, and the mobile station informed of the modification, in step 570.

Figure 6:
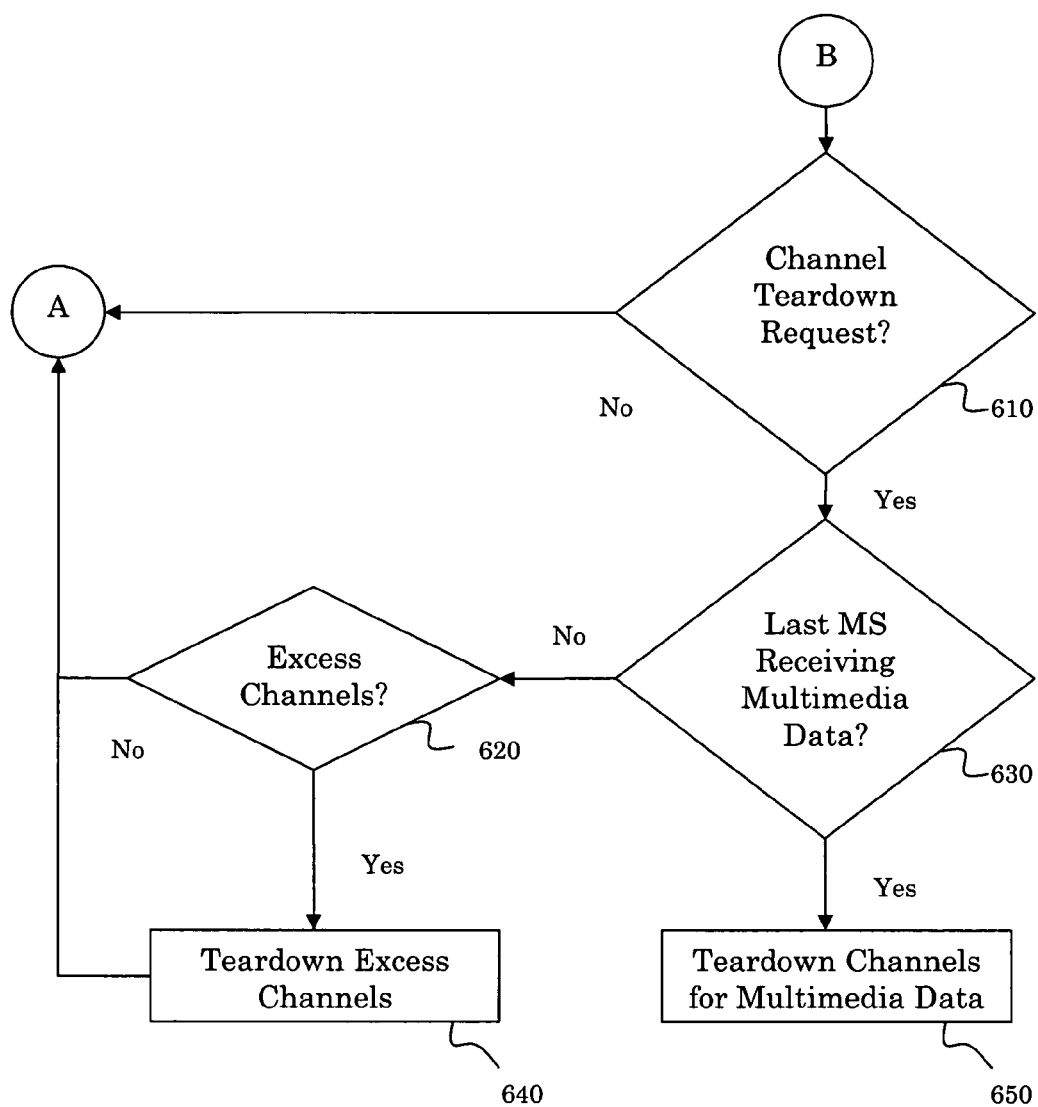
FIG. 6 illustrates an exemplary method for multimedia channel teardown in accordance with the present invention.

FIG. 6 illustrates an exemplary embodiment of a method for multimedia channel association teardown according to the present invention. After a multimedia channel association has been established, a multimedia channel association teardown may occur. FIG. 6 illustrates a method for tearing down a multimedia channel association between a base station and a mobile station in a wireless environment. In step 610, it is determined whether a mobile station has requested a channel teardown. If a channel teardown request has been received by a base station, it is determined in step 630 whether the mobile station requesting the teardown is the last mobile station receiving the multimedia data. If the mobile station is the last one, a teardown of all channels transmitting the multimedia data is performed, in step 650. If it is determined in step 630 that the mobile station requesting the teardown is not the last mobile station receiving the multimedia data, it is determined in step 620 whether there are excess channels to be torn down. If there are excess channels, a teardown of the excess channels is performed in step 640.

Encoding schemes such as MPEG-4 have a predefined set of encoding levels. Each of these encoding levels is mapped to a set of channels needed to support the bandwidth of the encoding level. The exemplary embodiments of the present invention illustrated in FIG. 2 and FIG. 4 trigger the associated signalling mechanism in the base stations. The embodiments illustrated in FIG. 5 and FIG. 6 correspond to the dynamic adjustment of the downlink data stream to conserve air link resources.

Figure 7:
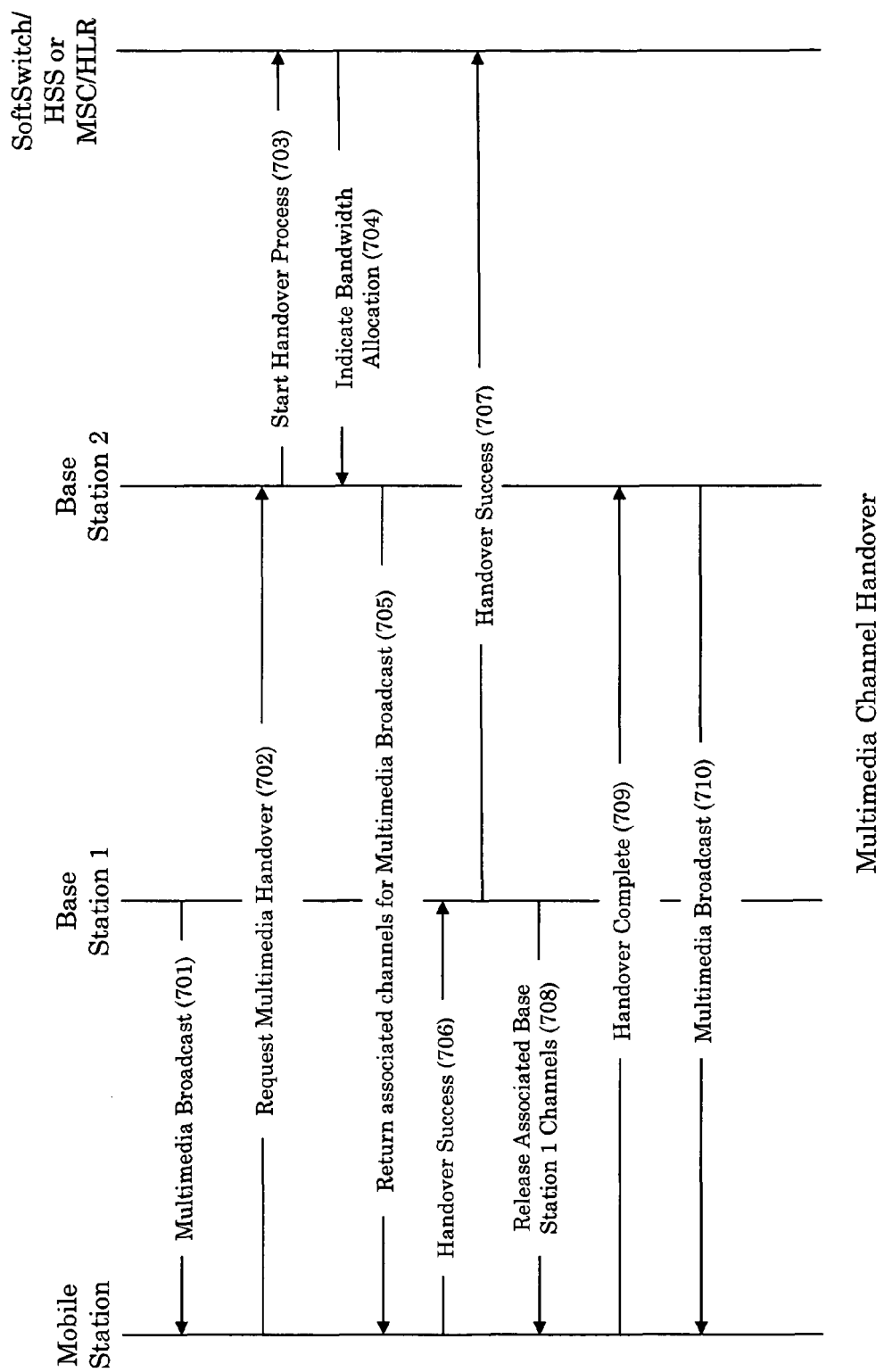
FIG. 7 illustrates an exemplary embodiment of a method for multimedia channel handover in accordance with the present invention.

In accordance with another exemplary embodiment of the present invention, there is a method for performing a multimedia channel handover of a mobile station from a first base station to a second base station in a wireless network. As illustrated in FIG. 7, a multimedia broadcast is transmitted to a mobile station in step 701. In step 702, the mobile station requests a multimedia channel handover from base station 2. After the handover request is made by the mobile station, the handover process begins, in step 703. An MSC, for example, indicates to the second base station the bandwidth allocation for the mobile station in step 704. Multimedia channels of the second base station are associated with the mobile station in step 705. A handover success indication may be sent from the mobile station to base station 1 in step 706, and the handover success indication may then be sent from the base station 1 to the MSC in step 707. The multimedia channels of the first base station associated with the mobile station are released in step 708.

As illustrated in FIG. 7, a handover complete indication is sent to the second base station in step 709, and a multimedia broadcast can be sent from the second base station to the mobile station in step 710. Although the foregoing method is described in relation to a single mobile station, the method may also be implemented with a plurality of mobile stations, wherein the handover for each of the mobile stations is treated individually.

In a wireless network with a plurality of mobile stations in accordance with the present invention, each of the mobile stations may be independent of the other mobile stations. Due to this independence, if a mobile station begins receiving a multimedia data transmission, the other mobile stations in the network are not affected. Likewise, if a mobile station stops receiving the multimedia data transmission, the other mobile stations in the network are not affected. In other words, mobile stations may join or leave a multicast group at any time, without affecting the rest of the group. No performance impacts are seen in the cell if the number of allocated channels does not change. If the number of allocated channels changes (i.e., increases or decreases), the cell capacity changes.

When joining a multicast group, i.e., a join operation, a mobile station may be given multicast listening channel allocations for receiving a multimedia data transmission, based upon the mobile station's access profile. An API may be used to perform this mapping. Listening may be considered to begin when the mobile station acknowledges the join operation. Joining a multicast group may be asynchronous to any broadcast operations at a base station.

When leaving a multicast group, a mobile station may stop listening on the allocated listening channels and notify the base station that it has left the multicast group.

The independence of the mobile stations also means that if the access profile for one mobile station is modified, the other mobile stations are not affected by the modification of the access profile.

In another exemplary embodiment of the present invention, there is a computer-readable medium encoded with a computer program for transmitting multimedia data to a mobile station in a wireless system. FIG. 2, which is discussed above, illustrates a program in accordance with this embodiment. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read. In accordance with another exemplary embodiment of the present invention, there is a computer-readable medium encoded with a computer program for establishing a multimedia channel association for a mobile station in a wireless environment. Since the instructions associated with the computer program of this embodiment have already been discussed above in relation to FIG. 4, that discussion is not repeated here. In another exemplary embodiment of the present invention, a computer-readable medium encoded with a computer program for tearing down a multimedia channel association between a base station and a mobile station in a wireless environment is provided. The instructions of the computer program correspond to the method steps described above with regard to FIG. 6. In another exemplary embodiment of a computer-readable medium in accordance with the present invention, the computer-readable medium is encoded with a computer program for modifying a multimedia channel access profile of a mobile station. The instructions corresponding to this computer program are discussed above in relation to FIG. 5. In yet another exemplary embodiment of the present invention, there is a computer-readable medium encoded with a computer program for performing a multimedia channel handover of a mobile station from a first base station to a second base station in a wireless network. The instructions included in this computer program are discussed above in relation to the steps of the method illustrated in FIG. 7.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting multimedia data over a plurality of channels to a mobile station in a wireless system, the method comprising the acts of:
  receiving, from the mobile station, a request for access to the multimedia data;
  determining an access profile of the mobile station, wherein the access profile indicates an amount of the multimedia data that is accessible to the mobile station;
  identifying, based on the access profile, which of the plurality of channels are accessible to the mobile station; and
  transmitting the multimedia data over the plurality of channels accessible to the mobile station,
  wherein the multimedia data is partitioned into a basic channel and one or more enhanced channels, and the access profile determines whether the basic channel is accessible to the mobile station and determines which of the enhanced channels are accessible to the mobile station.

2. The method of claim 1, further comprising the acts of:
  monitoring transmission conditions in the wireless system; and
  decreasing a number of the plurality of channels transmitted to the mobile station, if the transmission conditions become unacceptable for transmitting all of the plurality of channels.

3. The method of claim 2, wherein the transmission conditions comprise at least one of environmental conditions and bandwidth limits.

4. The method of claim 1, wherein the access profile comprises a service level agreement between a user of the mobile station and a service provider of the multimedia data transmission.

5. The method of claim 1, wherein the access profile of the mobile station is determined by associating a user identification of the mobile station with the access profile in a look-up table.

6. The method of claim 1, further comprising the act of:
  increasing the number of the plurality of channels transmitted to the mobile station, if the transmission conditions become acceptable for transmitting more of the plurality of channels.

7. The method of claim 1, further comprising the act of:
  billing the mobile station for use of the multimedia data, based upon the access profile.

8. The method of claim 1, further comprising the act of:
  modifying the access profile of the mobile station, based upon a request from the mobile station to modify the access profile of the mobile station.

9. The method of claim 8, further comprising the act of:
  billing the mobile station for use of the multimedia data, based upon the modified access profile.

10. A method for transmitting multimedia data to a plurality of mobile stations in a wireless system, the method comprising the acts of:

determining an access profile of each of the mobile stations, wherein the access profiles indicate an amount of the multimedia data that is accessible to each of the mobile stations;

monitoring transmission conditions in the wireless system;

transmitting the multimedia data and control data to each of the mobile stations with a highest resolution based upon the transmission conditions, wherein the control data determines an amount of the multimedia data accessible to each of the mobile stations based upon the access profile of each of the mobile stations; and decreasing a resolution of the multimedia data being transmitted to the mobile stations, when the transmission conditions become unacceptable for transmitting the multimedia data at the highest resolution, wherein the multimedia data is partitioned into a basic channel and one or more enhanced channels, and the access profile of each of the mobile stations determines whether the basic channel is accessible to each of the mobile stations and determines which of the enhanced channels are accessible to each of the mobile stations.

11. The method of claim 10, wherein the mobile stations in the wireless system are independent of each other.

12. The method of claim 10, further comprising the act of: increasing the resolution of the multimedia data being transmitted to the mobile stations to the highest resolution based upon the transmission conditions, if the transmission conditions become acceptable for transmitting the multimedia data at a higher resolution.

13. The method of claim 10, wherein the access profiles comprise a service level agreement between a user of the mobile station and a service provider of the multimedia data transmission.

14. The method of claim 10, wherein each of the access profiles is determined by associating a user identification of each of the mobile stations with each of the access profiles in a look-up table.

15. The method of claim 10, further comprising the act of: billing each of the mobile stations for use of the multimedia data, based upon the access profiles.

16. The method of claim 10, further comprising the act of: modifying the access profile of at least one of the mobile stations, based upon a request from the at least one of the mobile stations.

17. The method of claim 16, further comprising the act of: billing the at least one of the mobile stations for use of the multimedia data, based upon the modified access profile.

18. The method of claim 10, wherein the transmission conditions comprise at least one of environmental conditions and bandwidth limits.

19. A method for establishing a multimedia channel association between a base station and a mobile station in a wireless environment, the method comprising the acts of:

receiving a request for multimedia data from the mobile station;

determining an access profile of the mobile station, wherein the access profile indicates an amount of the multimedia data that is accessible to the mobile station;

establishing the multimedia channel association based upon the access profile;

informing the mobile station of the multimedia channel association; and increasing the number of the plurality of channels transmitted to the mobile station, when the transmission conditions become acceptable for transmitting more of the plurality of channels, wherein the multimedia data is partitioned into a basic channel and one or more enhanced channels, and the access profile determines whether the basic channel is accessible to the mobile station and determines which of the enhanced channels are accessible to the mobile station.

20. The method of claim 19, further comprising the acts of:

monitoring transmission conditions in the wireless system; and decreasing a number of the plurality of channels transmitted to the mobile station, if the transmission conditions become unacceptable for transmitting all of the plurality of channels.

21. The method of claim 20, wherein the transmission conditions comprise at least one of environmental conditions and bandwidth limits.

22. The method of claim 19, wherein the access profile comprises a service level agreement between a user of the mobile station and a service provider of the multimedia data transmission.

23. The method of claim 19, wherein the access profile of the mobile station is determined by associating a user identification of the mobile station with the access profile in a look-up table.

24. The method of claim 19, further comprising the act of: billing the mobile station for use of the multimedia data, based upon the access profile.

25. The method of claim 19, further comprising the act of: modifying the access profile of the mobile station, based upon a request from the mobile station to modify the access profile of the mobile station.

26. The method of claim 25, further comprising the act of: billing the mobile station for use of the multimedia data, based upon the modified access profile.

27. The method of claim 19, further comprising, for tearing down the multimedia channel association between the base station and the mobile station, the acts of:

receiving a request for a multimedia channel association teardown;

determining whether the mobile station is the only mobile station receiving a multimedia data;

tearing down the multimedia channel association between the base station and the mobile station; and terminating the multimedia data stream, if the mobile station is the only mobile station receiving the multimedia data.

28. The method of claim 19, further comprising, for modifying the access profile of the mobile station, the acts of:

receiving a request for a modification to the access profile;

modifying the access profile, based upon the requested access profile modification, when the mobile station is authorized to have the requested modification to the access profile; and associating multimedia channels with the mobile station, based upon the modified access profile.

29. The method of claim 19, further comprising, for performing a multimedia channel handover of the mobile station from the base station to another base station in a wireless network, the acts of:

receiving a request for the multimedia channel handover for the mobile station;

allocating a bandwidth for the another base station to transmit a multimedia data stream to the mobile station;

associating multimedia channels of the another base station with the mobile station; and releasing multimedia channels of the base station associated with the mobile station.

\* \* \* \* \*